W. SHUFFLEBOTTOM & T. KENWORTHY.
MEANS FOR JOINING THE ENDS OF DRIVING AND OTHER ROPES.
APPLICATION FILED APR. 25, 1910.
981,802.
Patented Jan. 17, 1911.
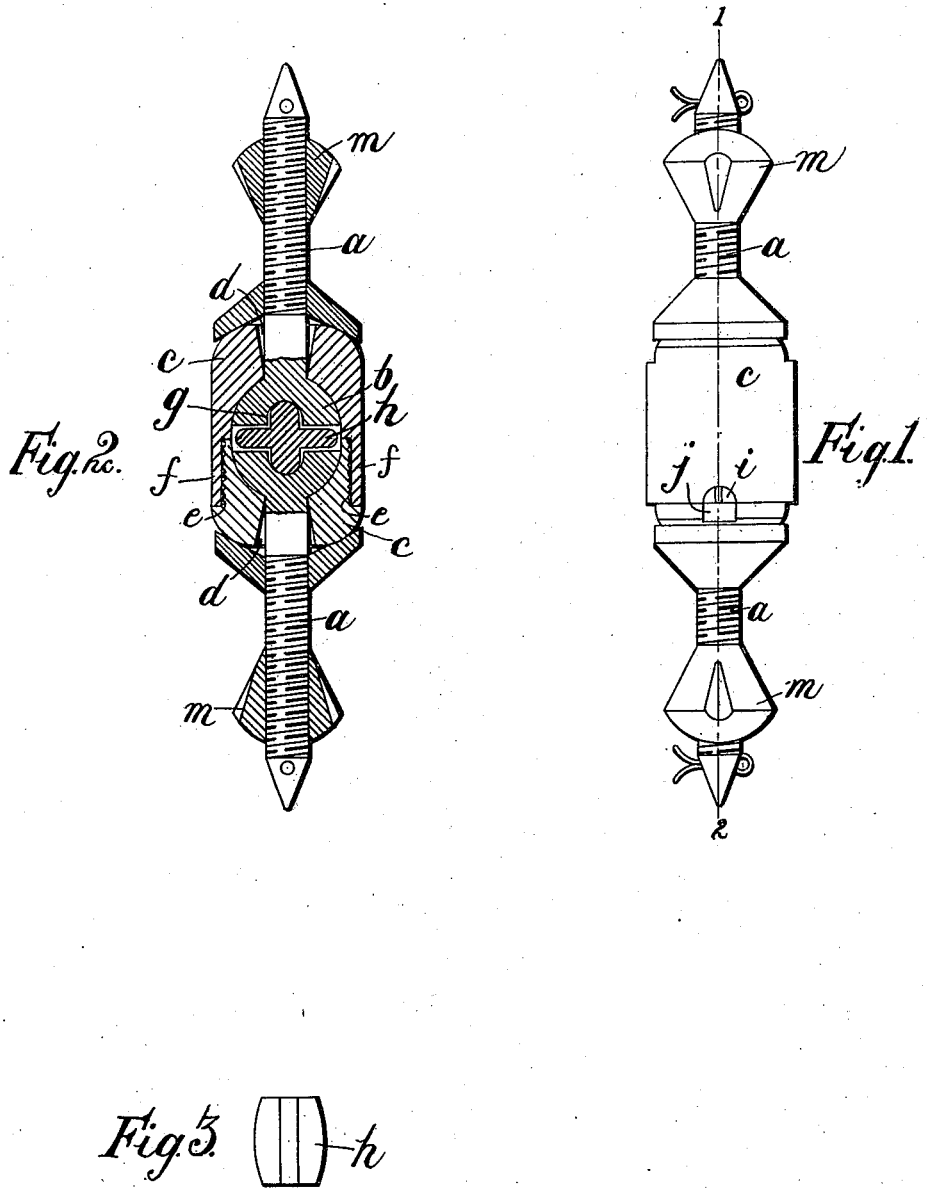

UNITED STATES PATENT OFFICE.

WILLIAM SHUFFLEBOTTOM AND THOMAS KENWORTHY, OF ASHTON-UNDER-LYNE, ENGLAND.

MEANS FOR JOINING THE ENDS OF DRIVING AND OTHER ROPES.

981,802.   Specification of Letters Patent.   Patented Jan. 17, 1911.

Application filed April 25, 1910. Serial No. 557,590.

*To all whom it may concern:*

Be it known that we, WILLIAM SHUFFLEBOTTOM and THOMAS KENWORTHY, subjects of the King of Great Britain and Ireland, and residents of Ashton-under-Lyne, in the county of Lancaster, England, joiner and grocer, respectively, have invented certain new and useful Improvements in Means for Joining the Ends of Driving and other Ropes, of which the following is a specification.

Our invention relates to improvements in means for joining the ends of driving and other ropes and refers particularly to the type of device described in the specification of our former Patent No. 943,168, dated Dec. 14, 1909, in which we described an arrangement of screws and cones in conjunction with external collars for gripping the ends of the ropes to be joined, the screws being afterward connected together by knuckle joints. Such joints only admitted of the bending of the rope about the axis of the pin coupling the parts together so that in a direction at right angles thereto considerable strain was thrown on the pin.

Our invention will be fully described with reference to the accompanying drawings in which, Figure 1 is a plan of the joining device constructed in accordance with our invention, Fig. 2 sectional plan of same, Fig. 3 side elevation of a small detail hereinafter referred to.

The invention is designed to obviate the defects hereinbefore referred to by providing an improved joining means for the screws which will admit of bending of the rope at the joint in any direction.

To this end our invention consists in forming the end of each screw $a$, that is to say its external end with a semi-spherical or spherical head $b$ and in conjunction with the heads so formed to employ hollow cups $c$ of a substantially semi-spherical character, each of which cups is mounted on one of the screws $a$ before the rope strands are bound thereto in the manner referred to in our previous patent hereinbefore mentioned.

The hole $d$ for the screw in each cup is sufficiently large to allow the former to have plenty of freedom of movement. The hole is preferably formed conical with its largest end at the outer end of the cup. The two cups are connected together by an overlapping portion $f$ and screw threads $e$, or in any other approved manner.

In some cases it is desirable to prevent the screws $a$ rotating on their axes in the cups. For this purpose we may form a transverse groove $g$ in the head of each screw and locate in the ring or collar $f$, coupling the two cups together, a crosswebbed transverse pin or key $h$, such as shown in Fig. 3, adapted to engage easily with the grooves in the screws while not interfering unduly with their universal flexibility within the cups. The edges of the pin or key may be slightly rounded both transversely and in elevation and the grooves in the screw heads may also be cambered somewhat from end to end so that when the whole of the parts are together the necessary freedom of movement will be obtained while locking the parts together in a rotary direction. As a further locking means a grub screw $i$ may be passed into one of the cups so that part of its head may engage with a groove or recess $j$ formed in one end of the collar $f$.

$m$ are the usual cones referred to in our patent hereinbefore mentioned and which along with the screws are passed into the interior of the rope strands and bound together by the ferrules mentioned in the patent aforesaid.

The arrangements described are of a very efficient character and when connected to the rope ends admit of considerable flexibility in every direction such as may be required particularly when they are applied to driving ropes which have to pass around a driving pulley.

What we claim as our invention and desire to secure by Letters Patent is:—

In a rope coupling, the combination, with two bolts arranged end to end, the adjacent ends of the said bolts being provided with spherical-shaped heads having cross-grooves and their opposite end portions being provided with means for securing them in the rope sections, of a pair of cups inclosing the said heads and loosely encircling the bolts so that said bolts may move to a limited extent out of line with each other in all directions, said cups being provided with means for securing them together, and a key inserted loosely in the said cross-grooves and preventing one bolt from revolving independent of the other.

In testimony whereof we have hereunto set our hands in the presence of two witnesses.

WILLIAM SHUFFLEBOTTOM.
THOMAS KENWORTHY.

Witnesses:
   AMY E. EVINS,
   DOROTHY M. DAVIES.